United States Patent
Kuo et al.

(10) Patent No.: US 10,157,466 B2
(45) Date of Patent: Dec. 18, 2018

(54) METHOD FOR AUTOMATIC TISSUE SEGMENTATION OF MEDICAL IMAGES

(71) Applicants: Riverside Research Institute, New York, NY (US); New York University, New York, NY (US)

(72) Inventors: Jen-wei Kuo, Jersey City, NJ (US); Jonathan Mamou, New York, NY (US); Xuan Zhao, Milpitas, CA (US); Jeffrey A. Ketterling, New York, NY (US); Orlando Aristizabal, Jackson Heights, NY (US); Daniel H. Turnbull, Larchmont, NY (US); Yao Wang, Livingston, NJ (US)

(73) Assignees: Riverside Research Institute, New York, NY (US); New York University, New York, NY (US)

( * ) Notice: Subject to any disclaimer, the term of this patent is extended or adjusted under 35 U.S.C. 154(b) by 49 days.

(21) Appl. No.: 15/412,939

(22) Filed: Jan. 23, 2017

(65) Prior Publication Data
US 2017/0213349 A1 Jul. 27, 2017

Related U.S. Application Data

(60) Provisional application No. 62/281,271, filed on Jan. 21, 2016.

(51) Int. Cl.
  *G06K 9/00* (2006.01)
  *G06T 7/11* (2017.01)
  *G06T 7/162* (2017.01)

(52) U.S. Cl.
  CPC ............... *G06T 7/11* (2017.01); *G06T 7/162* (2017.01); *G06T 2200/04* (2013.01);
  (Continued)

(58) Field of Classification Search
  None
  See application file for complete search history.

(56) References Cited

U.S. PATENT DOCUMENTS

6,651,246 B1 * 11/2003 Archambault .......... G06F 8/443
    717/149
8,095,914 B1 * 1/2012 Singh .................. G06F 11/3636
    714/38.1
(Continued)

OTHER PUBLICATIONS

Kuo, Jen-Wei, et al. "A Novel Nested Graph Cut Method for Segmenting Human Lymph Nodes in 3D High Frequency Ultrasound Images", IEEE, Apr. 2015, pp. 1-4, USA.
(Continued)

*Primary Examiner* — Kevin Ky
(74) *Attorney, Agent, or Firm* — Keith D. Nowak; Carter Ledyard & Milburn LLP

(57) ABSTRACT

A method to segment images that contain multiple objects in a nested structure including acquiring an image; defining the multiple objects by layers, each layer corresponding to one region, where a region contains an innermost object and all the objects nested within the innermost object; stacking the layers in an order of the nested structure of the multiple objects, the stack of layers having at least a top layer and a bottom layer; extending each layer with padded nodes; connecting the top layer to a sink and the bottom layer to a source, wherein each intermediate layer between the top layer and the bottom layer are connected only to the adjacent layer by undirected links; and measuring a boundary length for each layer.

6 Claims, 4 Drawing Sheets

(52) U.S. Cl.
CPC ............... *G06T 2207/10081* (2013.01); *G06T 2207/10088* (2013.01); *G06T 2207/10132* (2013.01); *G06T 2207/30101* (2013.01)

(56) References Cited

U.S. PATENT DOCUMENTS

| | | | | |
|---|---|---|---|---|
| 9,317,937 | B2* | 4/2016 | Le | ............................ G06T 11/00 |
| 2003/0093509 | A1* | 5/2003 | Li | ........................ G06F 11/0727 |
| | | | | 709/223 |
| 2003/0154271 | A1* | 8/2003 | Baldwin | ............... G06F 3/0601 |
| | | | | 709/223 |
| 2004/0219601 | A1* | 11/2004 | Xu | ........................... G06F 19/16 |
| | | | | 435/7.1 |
| 2005/0007383 | A1* | 1/2005 | Potter | ..................... G06F 9/451 |
| | | | | 345/619 |
| 2010/0130848 | A1* | 5/2010 | Lin | ......................... A61B 5/055 |
| | | | | 600/410 |
| 2015/0205398 | A1* | 7/2015 | Le | ........................... G06T 11/00 |
| | | | | 345/173 |
| 2015/0269725 | A1* | 9/2015 | Banaszak Holl | ..... G06T 7/0012 |
| | | | | 382/128 |
| 2015/0341223 | A1* | 11/2015 | Shen | ........................ H04L 41/12 |
| | | | | 709/223 |
| 2016/0286247 | A1* | 9/2016 | Phillips | .............. H04N 21/2385 |
| 2016/0286248 | A1* | 9/2016 | Phillips | .............. H04N 21/2385 |
| 2016/0286249 | A1* | 9/2016 | Phillips | .............. H04N 21/2385 |
| 2017/0185386 | A1* | 6/2017 | Kanhere | ................. G06F 8/433 |
| 2017/0324917 | A1* | 11/2017 | Mlinar | ................. H04N 5/3592 |

OTHER PUBLICATIONS

Kuo, Jen-Wei, et al. "Nested Graph Cut Method for Automatic Segmentation of High Frequency Ultrasound Images of the Mouse Embryo", IEEE, Sep. 2015, pp. 1-15, USA.

Saroul L. et al. "Prostate Segmentation in Echographic Images: A Variational Approach Using Deformable Super-Ellipse and Rayleigh Distribution" , IEEE, 2008, pp. 129-132, USA.

Ishikawa H. et al. "Exact Optimization for Markov Random Fields with Convex Priors", IEEE, Oct. 2003, vol. 25, No. 10 pp. 1333-1336, USA.

Delong A. et ano., "Globally Optimal Segmentation of Multi-Region Objects," International Conference on Computer Vision, Oct., 2009, pp. 1-8, Kyoto, Japan.

Li K. et ano., "Optimal Surface Segmentation in Volumetric Images—A Graph Theoretic Approach," IEEE, vol. 28, No. 1, Jan. 2006, pp. 119-134, USA.

Nosrati, M. et ano., "Local Optimization Based Segmentation of Spatially-recurring, Multi-Region Objects with Part 2 Configuration Constraints," IEEE, vol. 33, No. 9, Sep. 2014, pp. 1845-1859, USA.

* cited by examiner

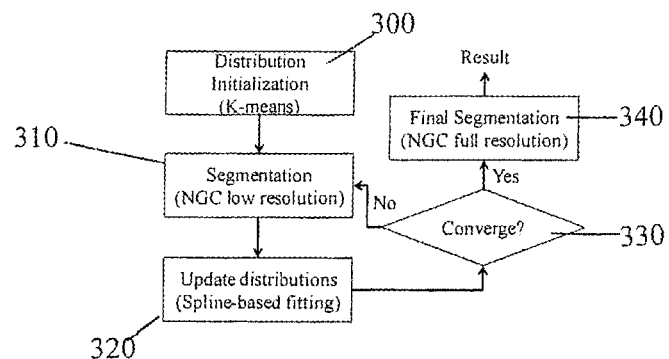
FIG. 3
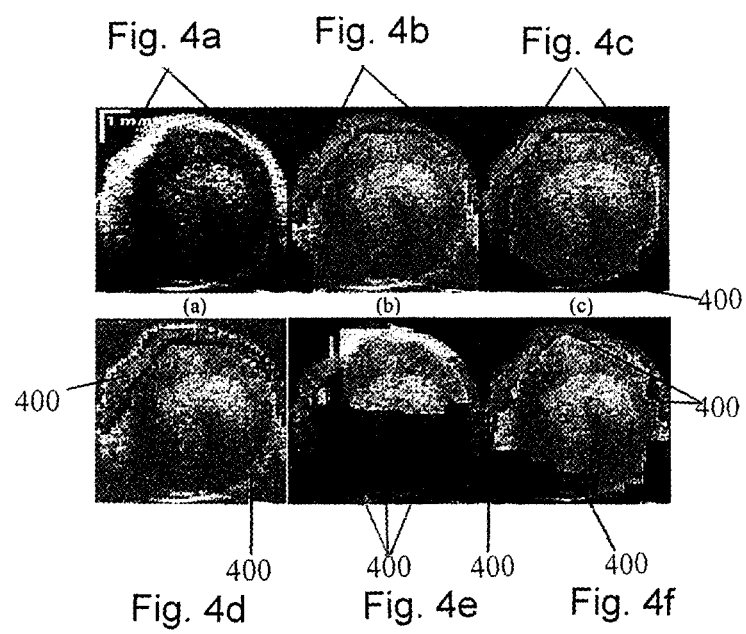
Fig. 4a  Fig. 4b  Fig. 4c
Fig. 4d  Fig. 4e  Fig. 4f

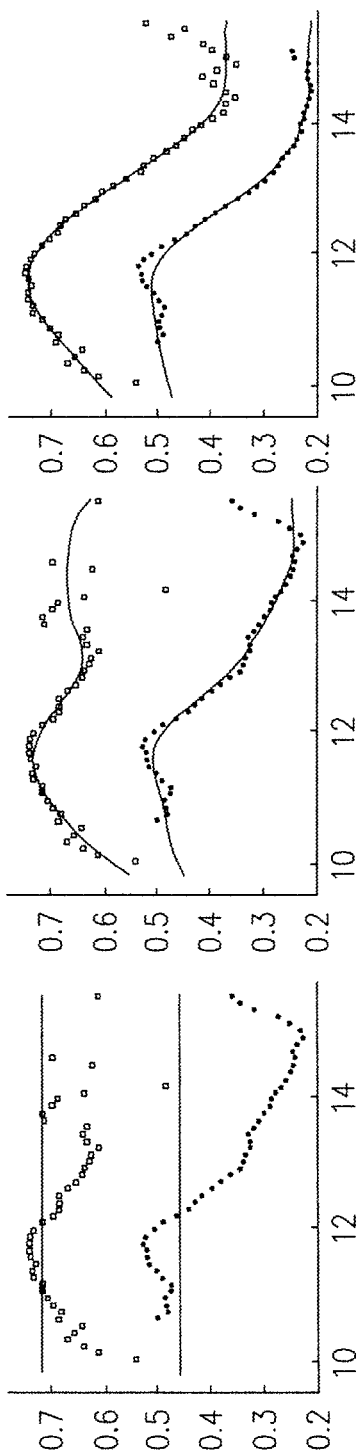

METHOD FOR AUTOMATIC TISSUE SEGMENTATION OF MEDICAL IMAGES

PRIORITY AND RELATED APPLICATION

This application claims priority to U.S. Provisional Patent Application No. 62/281,271 filed Jan. 21, 2016 entitled "Method of Automatic Tissue Segmentation of Medical Images" and is hereby incorporated by reference in its entirety.

FIELD OF THE INVENTION

The present invention relates to the study of images derived from data acquired via Ultrasound, MRI, CT or Quantitative ultrasound, for example. More specifically the present invention relates to the segmentation of images (2D or 3D) that contain multiple objects in a nested structure.

BACKGROUND OF THE INVENTION

High-frequency (i.e., >15 MHz) ultrasound (HFU) provides fine-resolution images on the order of 100 um because of its short wavelengths (i.e., <100 um) and small focal-zone beam diameters. HFU is able to acquire 3D data in a manner of minutes with the potential to provide real time dynamic information. Because of its rapid data acquisition and commercial availability, HFU has become a promising tool. Both Quantitative ultrasound and HFU are used to study morphology and/or organ function. The data acquired is rich in information and an automated method for studying features and properties of such data is beneficial. Such studies may require the segmentation of the data to properly analyze and characterize the different structures within the images being studied, for example structures within a developing embryo or normal and abnormal tissues of the human lymph node.

To obtain satisfactory segmentation, accurate intensity distributions are required. Some clustering algorithms, such as K-means or expectation maximization (EM), may be able to categorize the intensity value of all voxels into distributions to represent target objects. However, these approaches often yield unsatisfactory segmentation results, where the intensity fluctuates with depth significantly because of acoustic attenuation and focusing effects. A possible solution is to divide the image into several bands at specified depths, and apply clustering algorithms in each band. In addition, attenuation effects may become so extreme that certain boundaries become invisible. To mitigate similar attenuation and missing-boundary problems in prostate segmentation, "Prostate Segmentation in Echographic Images: A Variational Approach Using Deformable Super-Ellipse and Rayleigh Distribution," by Saroul et al. proposed a level-set based method. In the proposed approach, a super-ellipse model is used to preserve the shape, and Rayleigh distributions are used to model the intensity distributions in different subsections. The intensity distributions are updated with deformation to overcome the effect of attenuation, but this method requires proper initialization.

Another method, active shape model (ASM), segments objects with missing boundaries using the shape models from manually segmented data. However, ASM requires a dense set of feature points to appropriately model the details of complex shapes. A hybrid method has been developed that combines ASM and shape-constrained region growing to reduce the number of feature points. However, to capture the shape variations between different datasets, a large number of manually segmented datasets are necessary to generate a sufficient number of eigen-shapes. In practice, such manual segmentation may not be feasible.

Instead of using specific shape models, incorporation of structural constraints into image segmentation algorithms has gained attention in recent years. Some methods represent the structural prior between objects by a tree structure, where the leaves represent the objects and branch nodes represent groups, and exploit the tree structure when determining the segmentation sequence or solving a hierarchical cost. There have been several prior studies on using graph cuts to segment multiple objects with structural constraints including studies by Ishikawa, Delong and Boykov.

"Exact Optimization for Markov Random Fields with Convex Priors," by H. Ishikawa proposed to represent multiple objects by separated layers of a graph stacked together as a "layer cake" with linearly ordered labels for successive layers. If a regularization term is convex in terms of a linearly ordered label set, this multi-object segmentation problem can be solved as a binary graph cut problem, but fails to take advantage of specific relationships among objects. In Ishikawa's model, the foreground in an upper layer is restricted to be a subset of the foreground in the layer below by using directed interlayer edges with an infinite cost. Although how to incorporate structural constraints with this layer-cake structure was not addressed, Ishikawa's model has been widely used in segmenting objects with a recurring "containment" relationship. The regularization cost of Ishikawa's model is not discontinuity-preserving, which means that the cost between two pixels increases with the difference of their labels. "Globally Optimal Segmentation of Multi-Region Objects," by A. Delong and Y. Boykov proposed to make use of the known generic relationships between multiple objects such as "containment," "attraction," and "exclusion." Delong and Boykov's model also uses a set of layers to represent all objects as in Ishikawa's model, but all these layers are unordered and connected by inter-layer edges according to structural relationships. The known structural constraints are enforced by assigning proper costs along these directed inter-layer edges. Delong and Boykov's model can enforce a containment relationship, as in Ishikawa's model, and enforce an exclusion relationship, but there exists some restriction for the combination of relationships. Other proposed models include those by Li et al. and Nosrati. "Optimal Surface Segmentation in Volumetric Images—A Graph Theoretic Approach," by K. Li et al. proposed a graphical-based method using detachment constraints but is only applicable to cylindrical or spherical objects. "Local Optimization Based Segmentation of Spatially-recurring, Multi-Region Objects with Part Configuration Constraints," by Nosrati et al proposed a level-set-based method to segment spatially recurring objects with detachment relationships.

However, in situations where there are missing boundaries, detachment and attraction constraints cannot help to define the missing boundary, and therefore previously discussed graph-cut-based or level-set-based methods cannot obtain correct segmentation results without using sufficient initial seeds or adding extra parameters such as different weights for region regularizations.

SUMMARY OF THE INVENTION

Shape preservation and distribution estimation are two critical problems for segmentation. To mitigate these two problems, the present invention provides an iterative framework consisting of two stages: segmentation stage and distribution-estimation stage. In the segmentation stage, a novel multi-object graph-cut algorithm called nested graph cut (NGC) is used to simultaneously segment nested objects. NGC extends the graph cut framework to explicitly exploit the nested relationship between the objects. In addition, NGC is fully automatic and does not require initialization. In the distribution-estimation stage, a spline-based fitting process is used to estimate the distributions of the segmented objects as functions of depth. Iteration between the two stages yields satisfactory segmentation.

The proposed methods presented by Ishikawa, Delong and Boykov require seeds. Methods using a convex energy functional compared to methods using a non-convex energy functional (i.e., requiring initialization) can be more accurate and more flexible to achieve satisfactory results. Initializations (e.g., initial seeds) are not reusable, cumbersome and time consuming to initialize objects manually in a 3D image. In contrast, parameters used in a convex energy functional can be trained using typical images in each application setting, which are then applicable to all images in the same setting.

Compared to other discrete graph-cut based approaches, such as Ishikawa's model or Delong and Boykov's model, the present invention provides the following novel aspects:

For segmenting nested objects, the present invention uses undirected links between adjacent layers. Therefore, the graph cut calculation is accelerated using fast max-flow algorithms for undirected graphs;

Second, it includes padded nodes with infinite-cost links to the sink, so that all cuts at the image boundary in each layer are costly. With these padded nodes, NGC can avoid incorrect segmentations even though they satisfy a containment relationship;

NGC minimizes an energy functional consisting of a data term and a weighted sum of regularization terms, which essentially measure the foreground boundary length at a particular layer. The lower and upper bounds are derived on the ratio of weights between adjacent layers so that a correct segmentation can be obtained without using any initial seeds, even when two non-adjacent objects with similar intensity are partially touching due to the occasional absence of the intermediate object (referred to as a missing boundary); and a multi-resolution approach is provided for solving the NGC to reduce the computation time.

The present invention provides a general method that can be applied to segmentation problems satisfying a nested structure, which include but are not limited to lymph node tissues and mouse embryos.

The present invention provides a method of segmenting objects in a nested structure including initializing a distribution; segmenting an image in a low resolution using a nested graph cut with estimated distributions to obtain new results; updating the segment distribution with the estimated distributions and distribution estimates based on the new results; continue segmenting the image until estimated distribution and distribution estimates converge; and complete a final round of segmenting the image in a full resolution using a nested graph cut.

The present invention provides a method to segment images that contain multiple objects in a nested structure including acquiring an image; defining the multiple objects by layers, each layer corresponding to one region, wherein a region contains an innermost object and all the objects nested within the innermost object; stacking the layers in an order of the nested structure of the multiple objects, the stack of layers having at least a top layer and a bottom layer; extending each layer with padded nodes; connecting the top layer to a sink and the bottom layer to a source, wherein each intermediate layer between the top layer and the bottom layer are connected only to the adjacent layer by undirected links; and measuring a boundary length for each layer.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 3 is a flowchart of the proposed method;

FIGS. 4(a)-4(f) illustrate example images of the method presented; and

FIGS. 5(a)-5(c) present a graphical illustration used in conjunction with FIGS. 4a-4f.

DETAILED DESCRIPTION OF THE INVENTION

Prior methods have been used to segment multiple objects as discussed above. The present invention provides a graph designed to efficiently segment multiple objects with a nested relationship, i.e., an inner object is contained in an outer object. The proposed nested graph is simpler than the graphs in Ishikawa, Delong and Boykov, and, more importantly, it can perform segmentation correctly even when an object boundary is partially missing.

The NGC method segments objects in an image (either 2D or 3D) with a nested structure, which means all objects are spatially-recurring. In addition to detachment and attraction constraints, NGC provides a new way to differentiate objects having similar intensity distributions and missing boundaries by assigning appropriate weighting coefficients for different nested regions. Instead of applying shape priors, NGC defines the missing boundary of an object within a nested structure by the convex hull of its outer object. NGC reaches a global optimum of the defined energy functional.

A nested structure refers to a set of objects satisfying a recursive containment relationship. Instead of defining the nested relationship between objects directly, the nested relationship is defined in terms of regions, where region i is the union of objects 1 to i. denoted by $\Omega_i$=1 . . . L. The nesting relationship means:

$$\Omega_1 \subseteq \Omega_2 \ldots \subseteq \Omega_L \subseteq \Omega$$

where $\Omega$ is the entire image region. With this notation, object i is equal to $\Omega_i / \Omega_{i-1}$.

Figure 1A:
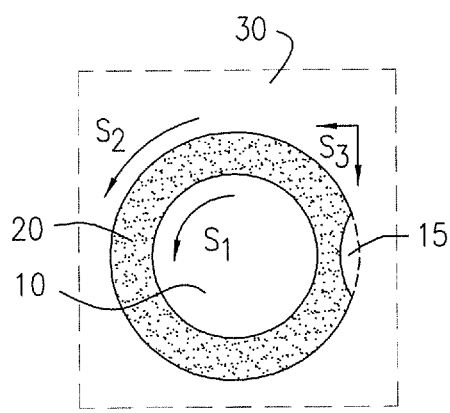
FIGS. 1(a)-1(d) illustrate image examples of nested objects and the desired results.
Figure 1C:
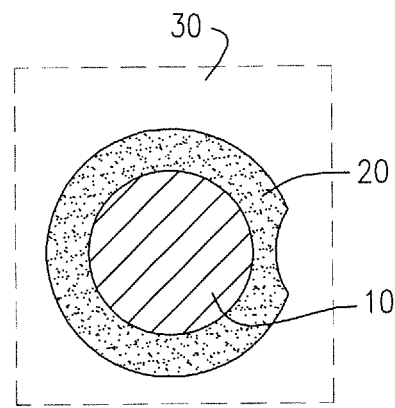
Figure 1B:
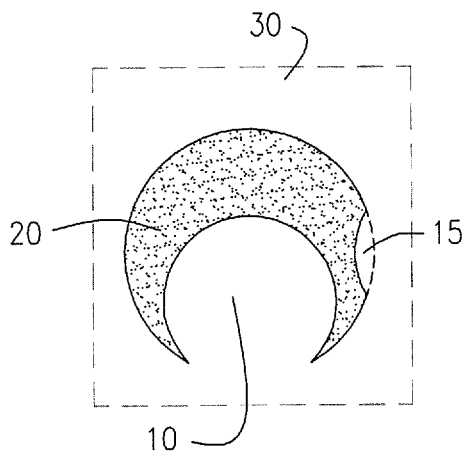
Figure 1D:
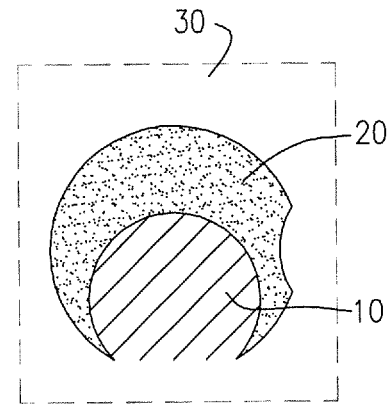

In addition to the aforementioned subset constraints, when some objects are not closed, for example object 10 in FIG. 1(b), NGC further requires that $\Omega_i$ be inside the convex hull of $\Omega_{i+1}$. This requirement is used to define the missing boundary between two contacting objects having similar intensity distributions. NGC does not require seeds from users to differentiate objects with similar intensity and makes all voxels inside the convex hull of object i+1 possible candidates for object i.

FIG. 1(a) through 1(d) are illustrations of images containing two nested regions having a background and the segmentation results using NGC. FIGS. 1(a) and 1(b) are example images with two nested objects. Object 10 is the inner white region having a boundary length $S_1$, object 20 is the middle black spotted region with a boundary length $S_2$. Both objects 10 and 20 are inside background 30 which has the same white color as object 10. Background 30, represented as the white region within the dotted lined box, has a boundary length of $S_3$. FIG. 1(*b*), has two white areas with missing boundaries, object 10 and area 15, inside the convex hull of object 20 which are candidates for object 10. In this case, NGC can obtain three different segmentation results in which area 15 is considered part of object 10, area 15 is considered part of background 30 or area 15 and object 10 are considered part of background 30. Users can obtain the desired NGC segmentation result by setting weighting parameters in the energy functional (1) discussed below. NGC can limit the region of object 10 inside the convex hull of black spotted region 20 and define the missing boundary between object 10 and the background 30 as a straight line. In the prior art, for example Ishikawa, object 10, area 15 and object 30 would be considered as the same object without the use of initial seeds. FIGS. 1(*c*) and 1(*d*) represent the result of FIGS. 1(*a*) and 1(*b*) respectively, using NGC. The lined region represents object 10 and white region represented within the dotted lined box represents background 30. In both cases, the inner region, object 10, is correctly separated from background 30.

Figure 2:
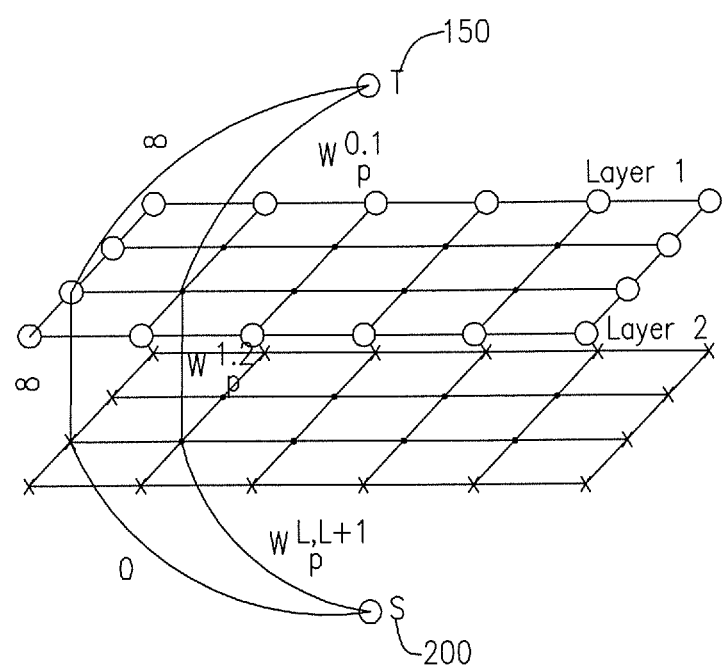
FIG. 2 illustrates the corresponding nested graph for segmenting an image containing two nested objects over a background.

A nested graph (NG) consists of multiple layers, with each layer corresponding to one region. The term "region i" refers to the region containing the object and all the objects nested within object i where object 1 is defined as the innermost object. FIG. 2 shows the NG for segmenting an image containing two nested objects over a background as shown in FIGS. 1*a*-1*d*. $W_p$ is the energy costs of inter-layer edges. The foreground nodes, nodes connected to source 200, in top layer 1 represent object 10 of FIG. 1. The foreground in bottom layer 2, represents object 20, the black spotted region outside of object 10 plus object 10 of FIG. 1. The black nodes in each layer of FIG. 2 represent pixels in the input image and the "x" and "o" nodes are the padded boundary nodes. Each layer in NG has links only with its upper and lower neighboring layers by undirected links. Because the segmentation result of a nested structure essentially satisfies the subset constraint, NGC does not need to use directed interlayer edges as in prior art. Top layer 1 corresponds to the innermost region (i.e., region 1), and the bottom layer 2 corresponds to the outermost region (not including the background). As shown in FIG. 2, top layer 1 is only connected to the sink 150, wherein "connected" means the pixel does not belong to the object in that layer and is considered background in this layer. Only the bottom layer 2 is connected to the source 200, wherein "connected" means the pixel belongs to the region in this layer and is considered foreground in this layer. Therefore, for a structure with L nested objects, the NG will have L layers with the top layer representing the innermost object. Only the top layer has links to the sink and only the bottom layer has links to the source. For any pixel only one inter-layer edge will be cut when solving the NGC. No matter how the graph is cut, the foreground in an upper layer (inner region) is always a subset of its lower layer (outer region), and the resulting objects will always satisfy the prescribed nested structure. For example, if the edge between layer i−1 and layer i is cut, this pixel is connected to the sink at layers 1 to i−1 (i.e., it is considered background in layers 1 to i−1), and is connected to the source at layers i to L (i.e., it is considered foreground in layers i to L or are in regions i to L). This means that this pixel is segmented to belong to object i. In addition, to avoid the entire image being segmented to a single object, each layer is extended with a one-pixel boundary, a padded node, around the image depicted as points "o" and "x" in FIG. 2. These extended pixels are forced to be connected to the sink by using an infinity cost. In the multi-region graph of prior art Ishikawa, each layer is connected to both the sink and source and with all related layers, all using bi-directional links.

Each node in layer i corresponds to a pixel in the image and has an associated binary variable $x^i_p$, with $x^i_p = 1$ indicating pixel p is assigned to region i and $x^i_p = 0$ indicating pixel p is not in region i. To determine $x^i_p$ we minimize the following energy function:

$$E(x^i_p, p \in P, i \in \mathcal{L}) = \sum_{i \in \mathcal{L}} \left( \sum_{p \in P} D^i_p(x^{i-1}_p, x^i_p) + \alpha^i \sum_{pq \in N} V^i_{pq}(x^i_p, x^i_q) \right) \quad (1)$$

$$D^i_p(x^{i-1}_p, x^i_p) = \begin{cases} 0 & x^i_p = x^{i-1}_p \\ W^{i-1,i}_p & x^i_p \neq x^{i-1}_p \end{cases} \quad (2)$$

$$W^{i-1,i}_p(I_p) = \frac{(I_p - I^c(i, \text{depth}(p)))^2}{2\sigma(i, \text{depth}(p))^2}$$

$$V^i_{pq}(x^i_p, x^i_q) = \begin{cases} 0 & x^i_p = x^i_q \\ 1 & x^i_p \neq x^i_q \end{cases} \quad (3)$$

where L denotes the set of layer indices, P is the set of pixels, and N defines neighborhood structure defining the set of connected pixel pairs in the entire image (18-connectivity was used to define the neighborhood structure in 3D). $V^i$ and $D^i$ in equation (1) stand for the regularization term and data term, respectively. The data cost in equation (2) is defined so that if a pixel is already assigned to object I with a cost depending on its intensity, this pixel will not cost additional energy in all other layers.

In conventional graph-cut methods, the edge cost $V^i_{pq}$ is typically inversely proportional to the spatial gradient between pixels p and q, so that the cut happens on the edges with a high gradient. Such a definition, however, does not work well in images with missing boundaries because it will discourage cutting along the missing boundary. Instead, $V^i_{pq}$ is defined in Eq. (3), so that the total regularization cost for layer i is the total boundary length of region i. Minimizing the edge cost in each layer is equivalent to minimizing the cost length. By minimizing the cost length, the NGC favors smoother region boundaries. Data term $D^i_p$ is defined as the log likelihood that pixel intensity $I_p$, belongs to object i. It is assumed the intensity of each object follows a Gaussian distribution. In order to deal with the depth-dependent signal attenuation, the means and variances of the Gaussian distributions are updated at every depth iteratively.

In (2), $I^c(i, \text{depth}(p))$ and $\sigma(i, \text{depth}(p))^2$ denote the mean and the variance of object i at the depth of pixel p. Ideally, the term $W^{i-1,i}_p(I_p)$ should be the conditional probability that intensity $I_p$ belongs to region i. The weighting coefficient ratio $\alpha^i/\alpha^{i+1}$ controls the strength of the shape constraint from the convex hull of object i+1 on object i. The coefficient $\alpha^i$ in the energy functional (1) is used to weigh the boundary cost of the detected region i. When $\alpha^i/\alpha^{i+1}=1$, the shape constraint is totally loose, and the strength increases when the ratio is decreased. Generally, the coefficient should be sufficiently large to promote smooth object boundaries but not too large to avoid the merging of different objects because of oversmoothing. Constraints are imposed on the coefficient ratios $\alpha^i/\alpha^{i+1}$ to promote correct segmentation when some objects have similar intensity distributions. Specifically, when object i and object i+2 have similar intensity distributions, we use the convex hull of an intermediate object (object i+1) as a shape constraint to define the boundaries between object i and object i+2, and the strength of the shape constraint from object i+1 can be controlled by the coefficient ratio $\alpha^i/\alpha^{i+1}$.

NGC treats all components inside the convex hull of object i+1 as candidates for object i. There is an upper bound and a lower bound constraint on the coefficient ratio. The upper bounds of the coefficient ratio between any two adjacent layers are derived as:

$$\frac{\alpha_i}{\alpha_{i+1}} < \frac{S_i - M_{i,i+1} + \sum_{t=1}^{i-1} S_t}{S_i + M_{i,i+1} + \sum_{t=1}^{i-1} S_t} \quad (4)$$

If training datasets with manual segmentation results are available, the range of $S_i$ and $M_{i,i+1}$ can be derived using (4) to determine the upper bounds for the coefficient ratios, and choose appropriate ratios satisfying the bounds. In practice, when manual segmentation results for estimating the bound in (4) are not available, a tighter bound, which only requires the knowledge of the boundary-missing rate of each region can be used. This tighter bound can be derived by recognizing that, that $(S_i - M_{i,i+1} + \Sigma_{t=1}^{i-1} S_t)/(S_i + M_{i,i+1} + \Sigma_{t=1}^{i-1} S_t)$ is always bigger than $(S_i - M_{i,i+1})/(S_i + M_{i,i+1}) = 1 - 2(M_{i,i+1}/(S_i + M_{i,i+1}))$.

so that (4) is always satisfied if the following condition is satisfied:

$$\frac{\alpha_i}{\alpha_{i+1}} < 1 - 2\left(\frac{M_{i,i+1}}{S_i + M_{i,i+1}}\right) \quad (5)$$

The upper bound according to (5) therefore shows that when region i has a missing boundary from region i+2, the coefficient ratio $\alpha^i/\alpha^{i+1}$ should be small to prevent it from being merged with region i+2. On the other hand, the ratio $\alpha^i/\alpha^{i+1}$ should be large enough to avoid part of region i+2 being merged with region i.

The lower bound region is defined as $$\frac{\alpha_i}{\alpha_{i+1}} > 1 - 2\left(\frac{M'_{i,i+1}}{S'_i + M'_{i,i+1}}\right) \quad (6)$$

Equations (5) and (6) define the upper and lower bound constraints for the coefficient ratio $\alpha^i/\alpha^{i+1}$. When the ratio is higher than the upper bound corresponding to the real boundary-missing rate, the constraint is too low and an inner object may be merged into an outer object. Even when the boundary-missing rate is 0, the ratio should be strictly less than 1. When the ratio is below the lower bound corresponding to the boundary-convexity rate of region i+1 the constraint is too strong and some regions that fall between the convex hull of region i+1 and the actual region may be falsely merged with the inner region i.

For example, in FIG. 1(b), there are two inner components inside the convex hull of the black spotted object 20, object 10 and area 15. The upper bound is imposed so that object 10 in FIG. 1(b) can be separated from background 30 in spite of the missing boundary between the two. The upper bound is always less than or equal to 1, which means that $\alpha^i/\alpha^{i+1}$. This is necessary so that object 10 and background 30 will not be falsely merged into the same region. The lower bound is imposed so that the area 15 in FIG. 1(b) will not be falsely considered to belong to the same region as the object 10. The small area 15 is the difference between the convex hull of object 20 and object 20. This region exists because the outer boundary of object 20 is non-convex. The lower bound is 0 if the boundary is convex. In general, the lower bound depends on the boundary-convexity rate of region i+1.

The upper and lower bounds are not sensitive to the variation between different images, therefore, the same set of coefficients can be used to segment similar images, for example, images of the same gestational stage. When the coefficients are chosen to satisfy these bounds, one can get correct segmentation results even in the presence of missing boundaries and non-convex boundaries.

One important difference between the present invention and prior art is that the present invention includes padded nodes along the image boundary as mentioned above. Without such padded nodes, NGC may obtain false segmentation. In this result, the entire white area—object 10, area 15 and background 30—in the original image of FIG. 1(b), is segmented as region 1 in layer 1, with a cut length of $S_1 + S_2$, and the entire image as region 2 in layer 2. This result satisfies the containment constraint and its regularization term $\alpha^1(S_1 + S_2)$. On the other hand, for the correct segmentation result in FIG. 1(c), the cut length in layer 1 is $S_1$ and that in layer 2 is $S_2$ and the total regularization cost is $\alpha^1 S_1 + a^2 S_2$. The upper bound for the alpha ratio requires that $\alpha^1 < \alpha^2$. False segmentation can be caused by not assigning any cost when the cut between the foreground and the background is along the image boundary.

To avoid this problem, each layer in NG is padded with a one-pixel-thick boundary around the image domain (illustrated by points "o" and "x" in FIG. 2). The padded nodes, "o," "x," are connected to sink 150 and considered background pixels by assigning an infinite cost on the link connecting to sink 150 and zero cost on the link connecting to source 200 in FIG. 2. The total regularization cost of the correct segmentations in FIG. 1(c) remains at $\alpha^1 S_1 + \alpha^2 S_2$, with proper ratio $\alpha^1/\alpha^2$.

To obtain correct segmentation, NGC requires intensity distributions that accurately account for the effects of focusing and acoustic attenuation. FIG. 3 displays the framework of the present invention. Due to high-intensity noise, some pixels may have greater intensity than the intensity of the pixels of other objects within the structure. This kind of noise can happen along the narrow gaps between strong edges. When necessary to mitigate similar noise, known as the halo artifact in fluorescence images, a modified ARBD may be used to pre-process the 3D HFU images and obtain a "compensation" image. This image typically has high values at the thin gaps between edges and low (even negative) values at the strong edges. The pre-processed image r can be attained by subtracting the compensation term g from the original image f:

$$f^1 = f - \gamma g \quad (7)$$

where $g = (f*h) - (f*p)$.

The compensation term, g, is the difference between the convolution result of two Gaussian filters h and p. By deducting the compensation term, the high-intensity noise at the thin gap is eliminated, and the contrast of the edge is increased. In addition, following the modified use of ARBD, a coherence filter is applied as described in to $f^1$ to smooth the image and enhance the edges. The original intensity values are normalized to the range of 0 to 1. After pre-processing, some pixels have values outside this range and are truncated to the processed values in the range of 0 to 1 before applying NGC to the pre-processed image.

Following the optional pre-processing step, distribution initialization 300 is employed by first using the K-means algorithm, for example, to cluster all voxel intensities into groups, and use the mean and the variance of each group to initialize the Gaussian distribution of each object. For the first iteration of NGC when clusters have deep pixels having similar dark intensities, the mean and variance of the similar clusters, resulting from K-means, can be used to determine $W_p^{0,1}(I_p)$ in (2), and choosing the one having smaller weight. This helps segment deep pixels correctly. A sigmoid function is used it to determine the data term in Eq. (3). The threshold $I^T$ is set as the intersection of two Gaussian distributions (weighted by their individual prior probabilities), and the parameter $\alpha$ is determined from the slope of the curve between 80% and 20%, for example, of the peak value divided by the slope of the sigmoid function between 0.8 and 0.2 when $\alpha=1$.

Then, segmentation 310 is iterated between segmentation using NGC with the estimated distributions, and distribution estimation based on the new segmentation result. The iteration stops when the estimated distributions converge, 330. To reduce execution time, NGC is first iteratively applied at low spatial resolution (for example, ¼ in both horizontal and vertical direction until convergence). In the low-resolution phase, a L-layer NGC is applied to the low-resolution image, which is obtained by downsampling the original image by a factor of 2 in each dimension. After the low-resolution process, a segmentation result is obtained where the boundaries of all objects are close to the optimal position. Because the effect of acoustic attenuation and focusing should be smooth, the variation of the mean intensity of an object should also be smooth in depth. Therefore, the measured mean values are fit at different depths using cubic spline functions. In order for the fitted function not to be affected by potential outliers, the random sample consensus (RANSAC) method is used to perform robust regression. RANSAC can effectively identify outliers, and only use killers (i.e., good measurements) to find the fitting curve. The same procedure is used to estimate variances. These fitted mean and variance profiles are used in the next segmentation iteration. Iterations continue until the mean profiles converge, for example, 5 iterations.

Upon convergence 330, a final segmentation of NGC is applied 340 at full resolution using intensity distributions obtained from the low resolution process 310. In full resolution, the boundary of all objects can be refined by 2-layer NGC at the full resolution progressively. Because all objects have a nesting relationship, the boundary of object i is only bounded by object i+1 and object i+2. Therefore, we can use a 2-layer NGC on the pixels that are in the union of objects i to i+2 from the low-resolution solution to refine object i. For each 2-layer NGC all pixels initially labeled other than i to i+2 are fixed so that it takes substantially less time than running full-resolution NGC over all objects simultaneously.

Although a proper coefficient ratio $\alpha^i/\alpha^{i+1}$ can help NGC eliminate components caused by a non-convex boundary as described above, NGC may still yield some unwanted components. If necessary, a post processing step may be integrated to remove erroneous components. The largest volume component of object I is selected and used to initiate the process. Iteratively the volume of the next largest connected component is compared to the volume of the current object I. If the volume of the "next largest component" is larger than b % of the current object I, the connected component is added to the current object I. This process continues, adding the connected component until a connected component is smaller than b % and will not be added to object I.

EXAMPLE 1

3D Quantitative ultrasounds were used to detect cancerous regions in freshly dissected human lymph nodes (LNs). The LNs contain three parts—LN-parenchyma (LNP), fat and phosphate-buffered saline (PBS). The present invention was used to effectively detect the nested structure of the LN images.

Deep LNP pixels having a very dark intensity similar to PBS are recognized in the first iteration of NGC. The mean and variance of both the LNP cluster and the PBS cluster, resulting from K-means to determine $Wp^{0.1}(Ip)$ in (2), are used and the one having the smaller weight is chosen. This helps to make deep LNP pixels be segmented correctly.

FIG. 4(a) shows the original image obtained having the LNP, fat and PBS. FIG. 4(b) shows the segmentation of FIG. 4(a) after the first iteration of NGC using the initial distributions, where the deeper surrounding fat is falsely segmented as LNP because of attenuation effects. FIG. 5(a) shows the mean intensity of LNP (the line represented by circles) and fat (the line represented by squares) as a function of depth obtained from the segmentation result in FIG. 4(b). (The vertical axis is the intensity value and the horizontal axis is the depth. The 2 solid straight lines represent the initial means values obtained by K-means). Because NGC erroneously segmented the fat region in the bottom as LNP, and the mean value of LNP was larger than the true value at the right side of FIG. 5(a), iterating based on this falsely estimated mean profile tends to yield the same false segmentation result if the mean estimates are not corrected. Because the effect of acoustic attenuation and focusing should be smooth, the variation of the mean intensity of an object (LNP or fat) should also be smooth in depth. Therefore, we fit the measured mean values at different depths using cubic spline functions. In order for the fitted function not to be affected by potential outliers, the random sample consensus (RANSAC) method is used to perform robust regression. RANSAC can effectively identify outliers, and only use inliers (i.e., good measurements) to find the fitting curve. In FIG. 5(b), the lines are the resulting fitting curves, which mitigate the effect of attenuation and focusing. The same procedure is used to estimate variances. These fitted mean and variance profiles are used in the next segmentation iteration. Typically, after 5 iterations, the mean profiles of LNP and fat would converge. FIG. 4(c) show the result of NGC in low resolution after 5 iterations. FIG. 5(c) shows the mean profiles at the convergence, and FIG. 4(c) displays the corresponding final segmentation result of NGC. For comparison, FIG. 4(d) shows the segmentation result using the multi-region graph cut of FIG. 5 using the same initial distributions used by NGC to generate FIG. 4(b). Without initial seeds, this method cannot differential LNP and PBS and falsely labels both the LNP and PBS as LNP. For further comparison, FIG. 4(e) shows the segmentation result of watershed plus clustering and FIG. 4(f) shows the result using manual segmentation.

To quantify the performance of our segmentation method, the Dice similarity coefficient (DSC) was used, defined as DSC=2[X n Y]/([X]+[Y]) where X and Y are the LNP region identified by the segmentation algorithm and the expert manual segmentation, respectively. Table I below compares the performance of the present invention to the watershed-clustering (WC) method, which first applies a watershed transform to divide the LN into many small regions called basins with similar intensity, and then clusters all basins into three objects.

TABKE I

|  | Watershed + Clus | Our Method |
| --- | --- | --- |
| LN <= 3.6 m | 0.8023 + 0.1104 | 0.9131 + 0.05 |
| LN > 3.6 mm | 0.7309 + 0.1216 | 0.8771 + 0.10 |
| Over All | 0.7793 + 0.1184 | 0.8956 + 0.08 |
| In focal | 0.8806 + 0.0778 | 0.9374 + 0.04 |

The results obtained in the focal region (defined as the focal depth+1 mm) indicate that both methods perform satisfactorily. Both methods also perform better in smaller LNs where attenuation and focusing effects are less severe. To emphasize the performance gain in segmenting LNs with heavy attenuation, the LN database was split into two groups by size. For smaller LNs, the effect of attenuation is moderate and the performance of WC is better than in bigger LNs. Nevertheless, Table I reveals that our method not only significantly outperforms WC, but it also yields satisfactory performance independent of LN size.

EXAMPLE 2

The 3D HFU mouse-embryo images were acquired with a custom 40-MHz, five-element, annular-array system. For this study, 40 mouse-embryo 3D images spanning five mid-gestational stages from E10.5 to E14.5 were used. The dimension of the 3D image increases depending on gestational stages, ranging from by 149 by 40 to 200 by 200 by 100 voxels. The voxel size of the 3D HFU datasets was 25 by 25 by 50/MI. For all 40 images, semi-automatic segmentations of brain ventricles (BVs) were available, while only 28 out of the 40 images had manual segmentations of the embryonic head available. The contour of the embryonic head was manually drawn using Amira visualization software by a small-animal ultrasound imaging expert. These manual segmentations were used as ground truth to quantify the performance of the present invention.

Accurate segmentation of the BV and the head is essential for assessing the normal and abnormal development of the central nervous system of mouse embryos. Table II summarizes the parameter settings used in the experiment. The core NGC algorithm for segmenting four objects with nested relationship required only three parameters.

hence we set $\alpha^1/\alpha^2$ as 0.5 based in Eq. (5) for all images. Because the boundary-missing rate of the head is larger than the boundary missing rate of BVs, the ratio $\alpha^2/\alpha^3$ is smaller than $\alpha^1/\alpha^2$. For stages E12.5 to E14.5, we set the ratio to 0.33 to get a satisfactory segmentation. For stages E10.5 and E11.5, the boundary-missing rate of the head is even larger and makes the upper bound smaller than 0.33. Therefore, we set $\alpha^2/\alpha^3$ as 0.1 in E10.5 and E11.5.

After the ratios $\alpha^i/\alpha^{i+1}$ are decided, a proper $\alpha^1$ is set to balance the data term and the regularization term. Note that $\alpha^1$ should be proportional to the volume to surface ratio of the object in layer 1, which is in turn proportional to the resolution of the image for a spherical object. By evaluating the result of NGC in a few cases, $\alpha^1$ was chosen as 0.001 in full resolution in the experiment, and $\alpha^1$ in the low resolution was set to half of this value, or 0.0005.

NGC provided the largest average DSC and close-to-smallest voxel distance for the segmentation of BVs among the tested methods—ASM, ASM+RG ASM+SCRG, NGC with multi-resolution and NGC full resolution. NGC was not influenced by the large variation in shape among different datasets and gestational stages, and it can provide accurate segmentation without any shape prior (except the nested relationship between objects) and initial seeds. For the head segmentation, NGC either provides the best accuracy or is close to the best of the other methods.

NGC with multi-resolution yielded nearly identical results as NGC on the full resolution directly. This is as expected because NGC with multi-resolution finds its optimum by refining the result of NGC at low resolution. For a majority of test images, the result obtained with NGC at the low resolution is very close to the result obtained with NGC on full resolution directly.

The structure of the BVs changes dramatically over the five gestational stages investigated. Nevertheless, the same NGC algorithm was able to automatically segment the head and the BVs for all gestational stages. NGC performs segmentation based on the intensity information and hence is not sensitive to the shape variation of BVs in different stages. Through the use of the regularization term to enforce smoothness along the region boundaries, NGC essentially defines the missing boundary between the head and the uterus by the convex hull of amniotic fluid region. In the result of NGC, the boundary of the upper left part of the head is straight because the convex hull connected amniotic fluid regions by a straight line with minimal distance. In general, the boundary of the head may be incorrectly defined when the actual head region is not covered by the convex hull of amniotic fluid regions.

TABLE II

|  | ASM + RG | ASM | ASM + SCRG | NGC with multi-resolution | NGC on full resolution directly |
| --- | --- | --- | --- | --- | --- |
| E10.5 | 36.92 ± 1.11 | 36.06 ± 1.10 | 57.37 ± 6.05 | 239.9 ± 210.0 | 340.0 ± 230.1 |
| E11.5 | 38.08 ± 0.59 | 36.33 ± 0.27 | 109.4 ± 27.7 | 514.8 ± 213.5 | 1238 ± 834.4 |
| E12.5 | 39.19 ± 0.35 | 36.81 ± 0.16 | 132.7 ± 16.2 | 1143 ± 568.6 | 1884 ± 939.9 |
| E13.5 | 42.54 ± 1.21 | 38.13 ± 0.44 | 254.5 ± 47.1 | 1750 ± 1182 | 2880 ± 1820 |
| E14.5 | 44.68 ± 2.31 | 38.93 ± 0.87 | 306.1 ± 102.7 | 2132 ± 1260 | 4084 ± 2534 |
| Average | 39.81 ± 2.93 | 37.07 ± 1.20 | 157.3 ± 97.6 | 959.4 ± 903.3 | 1723 ± 1625 |

The bounds of the coefficient ratio $\alpha^i/\alpha^{i+1}$ depend on the boundary-missing rate and the boundary-convexity rate of object i and object i+1 respectively. The boundary-missing rate of BVs is below ¼ and the boundary-convexity rate is larger than ¼ based on the observation of our images, and In the testing data, the boundary-missing rates of BVs and the head did not vary dramatically in different images. Accurate segmentation was achieved with the same set of coefficient ratios for each gestational stage. In practice, upper bounds can be easily determined by estimating the possible range of boundary-missing rate. The lower bounds are more difficult to determine as it is harder to estimate the boundary-convexity rates of the image to be segmented. Instead of trying to determine the lower bound, one can just set $\alpha i/\alpha i+1$ a little bit lower than the upper bound, and if the segmentation result is not satisfactory, one can slightly increase the ratio if NGC segments unwanted components into object i and reduce the ratio slightly if object i is merged into object i+2.

Although the present invention has been described in conjunction with specific embodiments, those of ordinary skill in the art will appreciate the modifications and variations that can be made without departing from the scope and the spirit of the present invention.

The invention claimed is:

1. A method of segmenting objects in a nested structure comprising:
   initializing an amplitude distribution of each object to obtain estimated distributions;
   segmenting an image using a nested graph cut (NGC) with estimated distributions to obtain new segmentation results;
   iterating between segmentation using NGC with said estimated amplitude distributions and distribution estimation based on said new segmentation results; and
   continuing said iteration until said estimated amplitude distribution or segmentation converge; and
   when an erroneous segment part of an image segment exists, a post processing step to remove the erroneous segment part of the image segment, wherein the post processing step comprises:
   selecting a highest volume component of a segmented part;
   using the highest volume component to determine an acceptable volume percentage;
   selecting a next highest volume component of the segmented part and comparing the volume to the acceptable volume percentage, wherein if the volume is higher than the acceptable volume percentage, the next highest volume component is connected with the segmented part; and
   continuing comparing the volume components of different segment parts until the next highest volume component of the different segment parts is lower than the acceptable volume percentage.

2. The method as recited in claim 1 wherein the segmentation is based on intensity information.

3. The method as recited in claim 1 wherein a final round of segmenting an image uses intensity distributions obtained from full resolution segmentation.

4. The method as recited in claim 1 further comprising a spline based curve fitting process to estimate a depth dependent mean and variance caused by acoustic attenuation and focusing.

5. The method as recited in claim 1 wherein iterating between segmentation using NGC includes using a fitted means and variance profile and identifying inlier and outlier variations, wherein only the inlier variations are used.

6. The method as recited in claim 5 wherein the inlier variations of the fitted means and variance profile are used in a next segmentation iteration.

* * * * *